United States Patent Office 3,311,662
Patented Mar. 28, 1967

3,311,662
TETRAARYLBORON COMPOUNDS
Robert M. Washburn and Franklin A. Billig, Whittier, Calif., assignors to American Potash & Chemical Corporation, Los Angeles, Calif., a corporation of Delaware
No Drawing. Filed Nov. 30, 1962, Ser. No. 241,126
6 Claims. (Cl. 260—606.5)

This invention relates, in general, to novel tetraarylboron compounds and, more particularly, to sodium tetraarylboron compounds.

The use of sodium tetraphenylboron, $(C_6H_5)_4BNa$, as an analytic reagent is known. The sodium salt of this boron compound is soluble in water but the potassium, rubidium, cesium, ammonium, phosphonium and the like salts of tetraphenylboron precipitate quantitatively from an aqueous system. This unique property makes sodium tetraphenylboron a very valuable analytic reagent.

Heretofore, the procedures for the production of sodium tetraphenylboron have been extremely complex, requiring extensive purification procedures while producing only relatively low yields of the desired product.

The disadvantages inherent in all previously known procedures for the preparation of tetraarylborons have been overcome by the present invention. This invention also provides a new class of compounds which possess long-lasting biological toxicant activity. In general, the present invention provides a process for preparing a sodium tetraarylboron which comprises:

(A) preparing an aryl sodium compound in an organic solvent,
(B) admixing and reacting the aryl sodium compound with a boron compound, and
(C) recovering the resulting sodium tetraarylboron from the reaction mixture. The tetraarylboron can be isolated from the reaction mixture or not, as desired.

The aryl sodium compound which is utilized in this invention has the general formula ArNa In the above formula, Ar can be any one of the monovalent arene substituents: aryl, alkaryl, haloaryl, aryloxyaryl or alkoxyaryl. Preferably, this monovalent arene substituent, Ar, contains 6 to 12 annular carbon atoms and, preferably, 6 annular carbon atoms. Any substituents on the aromatic ring, other than hydrogen atoms, preferably are lower alkyl substituents.

The boron compounds which can be utilized according to this invention, have the formulas $BX_3$ $ArBX_2$ $(Ar)_2BX$ $Ar_3B$ $X_2B$—L—$BX_2$ $(Ar)_2B$—L—$B(Ar)_2$ $$\begin{array}{c} XB-L-BX \\ | \quad\quad | \\ Ar \quad\ Ar \end{array}$$

In the above boron compounds, Ar is as defined above, X can be either chlorine or bromine, i.e., a halogen having an atomic weight between 35 and 80. Fluorine is not used because $BF_3$ undergoes a number of side reactions leading to impure products. Chlorine is the preferred halogen. The bivalent arene substituent, L, can be any of the substituents arylene, haloarylene, alkarylene, aroxyarylene, oxy-di(arylene) or alkoxyarylene. Preferably these bivalent arene substituents contain from 6 to 12 annular carbon atoms, with 6 annular carbon atoms being the most preferred. The preferred substituent, other than hydrogen, which can be bonded to the bivalent aromatic group is a lower alkyl substituent. Each substituent on each boron atom in each of the boron compounds is independently selected for that position and can be like or dissimilar to the other substituents on that boron atom.

Generally, any organic solvent can be used which does not react with the boron compounds or the aryl sodium compound under the process conditions. Useful solvents include, for example, aromatic hydrocarbons such as benzene, toluene, xylene, and ethers such as diethyl ether, tetrahydrofuran, methyltetrahydrofuran, dimethyltetrahydrofuran, dimethyl ether of ethylene glycol, dimethylether of triethylene glycol, dibutyl ether and the like. It has been found that, in general, unreactive aromatic hydrocarbons can be used at higher initial temperatures than can the ethers. Mixtures of solvents can also be used. While the above list of solvents is illustrative of those which can be used in this invention the nature of the solvent is not critical so long as it is non-reactive.

Aryl sodium compounds can be prepared in high yields in aromatic hydrocarbon solvents. Those aromatic hydrocarbons containing aryl sodium compounds can conveniently be utilized as the media for the reaction of the aryl sodium compound with boron compounds. The reaction will proceed in the aromatic hydrocarbon solvent to yield sodium tetraarylborons, but the yields are increased and the reaction times are shortened if a polar solvent is used during the latter stages of the reaction. The ethers are particularly suitable polar solvents for use in these latter stages.

The initial reaction between an aryl sodium compound and a boron compound is exothermic and the reaction temperature is preferably controlled by some suitable means, such as external cooling or by the addition of a low-boiling nonreactive liquid which will boil at about 30–50° C. The latter method of cooling is very convenient for the large-scale production of sodium tetraarylboron. For example, the addition of isopentane will limit the temperature of the reaction to about 30° C. and the addition of 2,2-dimethylbutane will limit the reaction temperature to about 50° C. It is preferably to maintain the temperature between about 30 and 50° C. during the initial exothermic reaction; thereafter, the reaction temperature can be increased, if desired, to between about 80 and 110° C. Temperature of reaction is not, however, critical, it being only necessary that the decomposition temperatures of the reactants and products not be exceeded.

This invention provides a new class of disodium arylenebis (triarylborons) containing 2 boron atoms. These new disodium arylenebis (triarylborons) have the formula.

$$[Ar_3B-L-BAr_3]=2Na^+$$

In this formula, Ar and L have the same meaning assigned above. These compounds enjoy wide utility and in particular they are effective long-lasting biological toxicants. These compounds enjoy utility as gasoline additives to control the growth of biological material in gasoline storage tanks, also as additives to paint, wood, spray and dust preparations to inhibit the growth of fungi and bacteria.

These new disodium arylenebis (triarylborons) can be prepared by the reaction of an aryl sodium compound with a compound containing 2 boron atoms. Useful boron compounds are those having the formulas $$X_2B-L-BX_2$$

$$(Ar)_2B-L-B(Ar)_2$$

and $$XB-L-BX$$
$$\phantom{XB}|\phantom{-L-}|$$
$$\phantom{XB}Ar\phantom{-L-}Ar$$

In these boron compounds, X, L and Ar have the same meaning defined above.

Compounds having the formula $$ClB-L-BCl$$
$$\phantom{ClB}|\phantom{-L-}|$$
$$\phantom{ClB}Ar\phantom{-L-}Ar$$

can be prepared conveniently by the following series of reactions:

$(RO)_2B-L-B(OR)_2 + PCl_5 \rightarrow (RO)ClB-L-BCl(OR)$ $(RO)ClB-L-BCl(OR) + ArMgCl \longrightarrow$ 
$$RO-B-L-B-OR$$
$$\phantom{RO-}|\phantom{-L-}|$$
$$\phantom{RO-}Ar\phantom{-L-}Ar$$

$$RO-B-L-B-OR + PCl_5 \longrightarrow Cl-B-L-B-Cl$$
$$\phantom{RO-}|\phantom{-L-}|\phantom{ + PCl_5 \longrightarrow }|\phantom{-L-}|$$
$$\phantom{RO-}Ar\phantom{-L-}Ar\phantom{ + PCl_5 \longrightarrow }Ar\phantom{-L-}Ar$$

Compounds having the formula $$(Ar)_2B-L-B(Ar)_2$$

can be prepared conveniently by the following reaction:

$BrMg-L-MgBr + 2(Ar)_2BCl \rightarrow (Ar)_2B-L-B(Ar)_2$

Compounds having the formula $$Cl_2B-L-BCl_2$$

can be prepared conveniently by the following reactions $BrMg-L-MgBr + 2(RO)_3B \rightarrow$
$\phantom{BrMg-L-MgBr + }(RO)_2B-L-B(OR)_2 + 2MgBr(OR)$ $(RO)_2B-L-B(OR)_2 + PCl_5 \rightarrow Cl_2B-L-BCl_2$ Corresponding bromine compounds can be prepared by alternative procedures similar to those described above for the preparation of the chlorine compounds.

This invention provides a particularly desirable method for the production of sodium tetraphenylboron. According to this invention, either boron trichloride or boron tribromide, preferably boron trichloride, is reacted with phenyl sodium to produce a high yield of sodium tetraphenylboron. This procedure is very simple and straightforward and avoids the use of extraneous metal ions such as lithium. Further, the use of boron trifluoride which gives side reactions leading to impure products under the conditions of this invention, is avoided. The sodium chloride by-product of this process can be discarded without significant economic loss, which avoids the necessity of providing for its recovery.

The aryl sodium compound and boron compound can be supplied to the reaction mixture in any amounts with either one or the other or neither being in excess. Since these compounds react almost substantially stoichiometrically with one another at a relatively rapid rate, it is unnecessary to supply either reactant in excess but an excess of either reactant is not harmful to the reaction. Preferably a slight excess of the aryl sodium compound is employed. Generally no more than about 5 mole percent excess of the aryl sodium compound is employed.

The quantity of solvent employed in this reaction is not critical so long as it is sufficient to fluidize the reactants.

Super-atmospheric pressures can be used in this reaction if desired but they are not necessary. Super-atmospheric pressures can be used, if desired, to prevent the reactants or solvent from boiling off.

The sodium tetraarylboron which is recovered in the reaction mixture from the reaction between an arylsodium compound and a boron compound can be isolated from the reaction mixture or not, as desired. Isolation of the tetraarylboron can be accomplished by conventional techniques, including for example, solvent extraction, evaporation to dryness and the like.

Both the aryl sodium compound and the boron compound are reactive with oxygen and water. In order to prevent these reactants from being contacted with oxygen and water, preferably an inert atmosphere is maintained over the reaction mixture and provisions are made to insure that the reaction mixture is surrounded by a dry environment. Typical inert atmospheres include, for example, argon, nitrogen, and the like.

In the specification, claims and following examples, all parts and percentages are by weight unless otherwise specified. The following examples are submitted to illustrate even more clearly the invention and are not to be construed as limiting the invention.

*Example I*

A solution containing 25 ml. of xylene and chlorobenzene (17.1 g., 0.152 mole plus 0.008 mole [0.9 g.] excess) is added dropwise to a mildly agitated sodium dispersion (13.9 g. containing 6.99 g. Na, 0.304 mole) in 125 ml. xylene at such a rate as to keep the pot temperature below 30° C. A nitrogen atmosphere is maintained over the reaction mixture and the reaction environment is maintained in an hydrous state by the use of a drying tube. After all the chlorobenzene is added and the exothermic reaction has ceased, boron trichloride (4.5 g., 0.038 mole) is added to the mildly agitated phenylsodium preparation at such a rate that the reaction temperature remains below 30° C. After all the boron trichloride is added, the reaction mixture is poured onto 50 g. ice. The organic layer is separated, washed with three 10 ml. portions of distilled water and the water extracts are combined with the water layer. The strongly basic water solution containing sodium tetraphenylboron is neutralized with 6 N hydrochloric acid. The sodium tetraphenylboron in solution is converted to insoluble potassium salt by the addition of potassium chloride (2.8 g., 0.038 mole). This provides an easy method of analysis for sodium tetraphenylboron without the necessity of evaporating the water layer to dryness. The gummy precipitate is collected and washed with distilled water and petroleum ether. The solids are dried over 65% sulfuric acid in a dessicator for 18 hours, ground in a mortar and again washed with petroleum ether and then air dried for 3 hours. The solids are soluble in acetone. A good yield of sodium tetraphenylboron is obtained.

*Example II*

Using essentially the same conditions described in Example I, except that boron tribromide is substituted for the boron trichloride, producing sodium tetraphenylboron.

*Examples III–VII*

Using the conditions described in Example I, additional sodium tetraarylborons are prepared as shown in the following table.

| Example | Boron Compound | Aryl Sodium | Solvent | Product |
|---|---|---|---|---|
| III | $BCl_3$ | $Cl-C_6H_4Na$ | $CH_3-THF^a$ | $(Cl-C_6H_4)_4BNa$ |
| IV | $BBr_3$ | $CH_3-C_6H_4Na$ | $C_6H_6+(CH_3OCH_2CH_2)_2O$ | $(CH_3-C_6H_4)_4BNa$ |
| V | $BCl_3$ | $C_2H_5-C_6H_4Na$ | $(CH_3OCH_2CH_2)_2O$ | $(C_2H_5-C_6H_4)_4BNa$ |
| VI | $BCl_3$ | $Br-C_6H_4Na$ | $THF^b$ | $(Br-C_6H_4)_4BNa$ |
| VII | $BCl_3$ | $C_6H_5O-C_6H_4Na$ | $C_6H_5+CH_6+(CH_3OCH_2CH_2)_2O$ | $(C_6H_5O-C_6H_4)_4BNa$ | a Methyltetrahydrofuran.   b Tetrahydrofuran.

Example VIII

Using the same conditions described in Example I, above, 3 moles phenylsodium are reacted with 1 mole of phenyldichloroborane to give sodium tetraphenylboron.

Examples IX–XIII

Using the conditions described in the foregoing Example I, 3 moles of certain aryl sodium compounds are reacted with one mole of certain aryldihaloboranes to yield the tetraarylborons shown in the following table.

sodium preparation thus formed, there is added a solution of 18.1 g. (75 moles) of triphenylborane in 75 ml. toluene. The mixture is stirred and heated to 110° C. and after 5 hours the mixture assumes a grey color. After a total of 16 hours at 110° C. the reaction mixture is cooled to room temperature and admixed with 20 ml. water. The mixture is extracted with 750 ml. acetone in 7 portions. The solvent is removed by evaporation from the combined acetone extracts leaving an orange-colored gum. Analysis indicates a 51% yield of sodium tetraphenylboro.

| Example | Boron Compound | Aryl Sodium | Solvent | Product |
|---|---|---|---|---|
| IX | $C_6H_5BBr_2$ | $C_6H_5Na$ | $C_8H_{10}+(C_2H_5)_2O$ | $(C_6H_5)_4BNa$. |
| X | $Cl-C_6H_4BCl_2$ | $C_6H_5Na$ | THF a | $(C_6H_5)_3BNa$<br>\|<br>$C_6H_4-Cl$. |
| XI | $CH_3O-C_6H_4BCl_2$ | $C_6H_5Na$ | $CH_3OCH_2CH_2OCH_3$ | $(C_6H_5)_3BNa$<br>\|<br>$C_6H_4-OCH_3$. |
| XII | $C_6H_5O-C_6H_4BCl_2$ | $C_6H_5Na$ | $C_6H_5-CH_3+CH_3OCH_2CH_2OCH_3$ | $(C_6H_5)_3BNa$<br>\|<br>$C_6H_4-OC_6H_5$. |
| XIII | $Cl-C_6H_4BCl_2$ | $CH_3-C_6H_4Na$ | $(CH_3OCH_2CH_2)_2O$ | $(CH_3-C_6H_4)_3BNa$<br>\|<br>$C_6H_4-Cl$. | a Tetrahydrofuran.

Example XIV

Using substantially the conditions described in Example I, 2 moles of phenylsodium are reacted with 1 mole of diphenylchloroborane to yield sodium tetraphenylboron.

Examples XX–XXIII

The reaction of 1 mole of certain triarylboranes with 1 mole of certain arylsodium compounds is used to prepare a variety of tetraarylborons, as shown in the following table.

| Example | Boron Compound | Aryl Sodium | Solvent | Product |
|---|---|---|---|---|
| XX | $(CH_3-C_6H_4)_3B$ | $C_6H_5Na$ | $CH_3OCH_2CH_2OCH_3$ | $[(CH_3-C_6H_4)_3BC_6H_5]Na$. |
| XXI | $(C_6H_5)_3B$ | $Cl-C_6H_4Na$ | THF a | $[(C_6H_5)_3B(C_6H_4-Cl)]Na$. |
| XXII | $(CH_3O-C_6H_4)_3B$ | $C_6H_5Na$ | $(CH_3OCH_2CH_2)_2O$ | $[(CH_3O-C_6H_4)_3BC_6H_5]Na$. |
| XXIII | $(C_6H_5)_3B$ | $CH_3C_6H_4Na$ | $CH_3-THF$ b | $[(C_6H_5)_3B(C_6H_4CH_3)]Na$. | a Tetrahydrofuran.   b Methyltetrahydrofuran.

Examples XV–XVIII

Using substantially the conditions described in Example I, above, 2 moles of certain arylsodium compounds are reacted with 1 mole of certain diarylhaloboranes to yield tetraarylborons as shown in the following table.

Example XXIV

The addition of one mole of $Cl_2B-C_6H_4-BCL_2$ to 6 moles of phenylsodium in dimethylether of ethylene glycol causes an exothermic reaction which is controlled to below about 45° C. to insure good yields. After the

| Example | Boron Compound | Aryl Sodium | Solvent | Product |
|---|---|---|---|---|
| XV | $(C_6H_5)_2BBr$ | $C_6H_5Na$ | $C_6H_6+CH_3OC_2H_4OCH_3$ | $(C_6H_5)_4BNa$. |
| XVI | $(Cl-C_6H_4)_2BCl$ | $C_6H_5Na$ | $CH_3OC_2H_4OCH_3$ | $[(ClC_6H_4)_2B(C_6H_5)_2]Na$. |
| XVII | $(CH_3OC_6H_4)_2BCl$ | $C_6H_5Na$ | THF a | $[(CH_3OC_6H_4)_2B(C_6H_5)_2]Na$. |
| XVIII | $(C_6H_5)_2BCl$ | $CH_3C_6H_4Na$ | $C_6H_5-CH_3+THF$ a | $[(CH_3C_6H_4)_2B(C_6H_5)_2]Na$. | a Tetrahydrofuran.

Example XIX

To a sodium dispersion prepared from 3.8 g. (165 mg.-atom) of sodium, in 50 ml. n-decane and 0.5 ml. oleic acid, there is added dropwise a solution of 7.6 ml. (75 moles) of chlorobenzene in 20 ml. n-decane. The addition requires 10 min. and the temperature is maintained between 30–36° C. and a dry argon gas sweep is used. The dark reaction mixture formed is stirred for 45 minutes at 30–40° C. Thereafter, to the black phenyl-exothermic reaction has subsided, the reaction is completed by heating the reaction mixture to boiling for a short time. Evaporation of the solvent leaves a mixture composed primarily of disodium phenylenedi(triphenylboron) and sodium chloride. The recovered product is isolated by fractional crystallization from water. Alternatively the product can be isolated by extraction with acetone.

Examples XXV–XXVIII

Using essentially the same conditions as described in Example XXIV, above, other arylenedi(triarylborons) are prepared as shown in the following table.

| Example | Boron Compound | Aryl Sodium | Solvent | Product |
|---|---|---|---|---|
| XXV | $Br_2BC_6H_4BBr_2$ | $C_6H_5Na$ | $C_6H_5CH_3+CH_3OCH_2CH_2OCH_3$ | $[(C_6H_5)_3BC_6H_4B(C_6H_5)_3]2Na$ |
| XXVI | $Cl_2BC_6H_3OC_6H_3BCl_2$ | $C_6H_5Na$ | $C_6H_5CH_3+CH_3-THF$ [a] | $[(C_6H_5)_3BC_6H_3OC_6H_3B(C_6H_5)_3]2Na$ |
| XXVII | $Cl_2BC_6H_4-C_6H_4BCl_2$ | $C_6H_5Na$ | $(CH_3)_2-THF$ [b] | $[(C_6H_5)_3BC_6H_4-C_6H_4B(C_6H_5)_3]2Na$ |
| XXVIII | $Cl_2BC_6H_4BCl_2$ | $CH_3C_6H_4Na$ | $C_6H_5CH_3+CH_3OCH_2CH_2OCH_3$ | $[(CH_3C_6H_4)_3BC_6H_4B(C_6H_4CH_3)_3]2Na$ |

[a] Methyltetrahydrofuran. [b] Dimethyltetrahydrofuran.

Example XXIX

Using substantially the same reaction conditions described in Example XXIV, above, 4 moles of phenylsodium are reacted with 1 mole of p-bis(phenylchloroborano)benzene to give disodium phenylenedi(triphenylboron).

Examples XXX–XXXII

Using substantially the same conditions described in Example XXIV (above, other arylenedi(triarylborons) are prepared from bis-(arylhaloborano)arylenes and arylsodiums as shown in the following table.

| Example | Boron Compound | Aryl Sodium | Solvent | Product |
|---|---|---|---|---|
| XXX | $ClB-C_6H_4-BCl$ with $C_6H_5$, $C_6H_5$ | $CH_3C_6H_4Na$ | $CH_3OCH_2CH_2OCH_3$ | $[(CH_3C_6H_4)_2B-C_6H_4-B(C_6H_4CH_3)_2]2Na$ |
| XXXI | $BrB-C_6H_4-BBr$ with $C_6H_5$, $C_6H_5$ | $C_6H_5Na$ | $(CH_3)_2-THF$ [a] | $[(C_6H_5)_3B-C_6H_4-B(C_6H_5)_3]2Na$ |
| XXXII | $ClB-C_6H_4-BCl$ with $C_6H_4CH_3$, $C_6H_4CH_3$ | $C_6H_5Na$ | $(CH_3OCH_2CH_2)_2O$ | $[(C_6H_5)_2B-C_6H_4-B(C_6H_5)_2]2Na$ with $C_6H_4CH_3$, $C_6H_4CH_3$ |

[a] Dimethyltetrahydrofuran.

Example XXXIII

Using essentially the conditions described in Example XXIV, above, 2 moles of phenylsodium are reacted with 1 mole of bis-(diphenylborano)benzene to yield disodium phenylenedi(triphenylboron).

Examples XXXIV–XXXVII

Using essentially the same conditions described in Example XXIV, arylenedi(triarylborons) can be prepared by the reaction of 1 mole of certain bis-(diarylborano)arylenes and 2 moles of certain arylsodium compounds as shown in the following table.

Example XXXVIII

The addition of 1.0 mole of boron trichloride to 4.0 moles of phenylsodium in toluene causes an exothermic reaction. After all of the boron trichloride is added, 100 ml. of the dimethylether of ethylene glycol is added and the reaction mixture is heated under reflux. The sodium tetraphenylboron product can be isolated in a variety of ways: (a) water can be added and the xylene layer separated and discarded. The water layer is then evaporated to dryness and the product extracted with acetone or chloroform; (b) the reaction mixture can be filtered and the solids can be treated with a small quantity of water and the product extracted with acetone or chloroform; or (c) the reaction mixture can be evaporated to dryness and the product extracted with acetone or chloroform.

Typical monovalent substituents identified above as, Ar, which can be utilized in the present invention include, for example, the substituents.

*Aryl.*—phenyl, naphthyl, biphenylyl
*Alkaryl.*—tolyl, xylyl, ethylphenyl
*Haloaryl.*—chlorophenyl, bromophenyl, dichlorophenyl
*Aroxyaryl.*—phenoxyphenyl, chlorophenoxyphenyl, bromophenoxyphenyl, tolyloxyphenyl
*Alkoxyaryl.*—methoxyphenyl, ethoxyphenyl, benzyloxyphenyl.

The bivalent substituents identified above as, L, include, for example, the following:

*Arylene.*—phenylene, naphthylene
*Haloarylene.*—chlorophenylene, bromophenylene
*Alkarylene.*—tolylene, ethylphenarylene
*Aroxyarylene.*—phenoxyphenylene, tolyloxyphenylene

| Example | Boron Compound | Aryl Sodium | Solvent | Product |
|---|---|---|---|---|
| XXXIV | $(C_6H_5)_2BC_6H_4B(C_6H_5)_2$ | $CH_3C_6H_4Na$ | $CH_3OCH_2CH_2OCH_3$ | $[(C_6H_5)_2B-C_6H_4-B(C_6H_5)_2]2Na$ with $C_6H_4CH_3$, $C_6H_4CH_3$ |
| XXXV | $(CH_3C_6H_4)_2BC_6H_4B(C_6H_4CH_3)_2$ | $C_6H_5Na$ | THF [a] | $[(CH_3C_6H_4)_2B-C_6H_4-B(C_6H_4CH_3)_2]2Na$ with $C_6H_5$, $C_6H_5$ |
| XXXVI | $(Cl-C_6H_4)_2BC_6H_4B(C_6H_4-Cl)_2$ | $C_6H_5Na$ | $CH_3OCH_2CH_2OCH_3$ | $[(Cl-C_6H_4)_2B-C_6H_4-B(C_6H_4-Cl)_2]2Na$ with $C_6H_5$, $C_6H_5$ |
| XXXVII | $(C_6H_5)_2BC_6H_4-C_6H_4B(C_6H_5)_2$ | $C_6H_5Na$ | $(CH_3OCH_2CH_2)_2O$ | $[(C_6H_5)_3B-C_6H_4-C_6H_4-B(C_6H_5)_3]2Na$ |

[a] Tetrahydrofuran.

*Oxy-(diarylene)*.—oxy-di(phenylene), oxy-di(tolylene), oxy-di(chlorophenylene)

*Alkoxyarylene*.—methoxyphenylene, ethoxyphenylene.

As will be understood by those skilled in the art, what has been described is the preferred embodiment of the invention. However, many modifications, changes, and substitutions can be made therein without departing from the scope and spirit of the following claims.

What is claimed is:

1. The composition having the formula:

$$[Ar_3B-L-BAr_3] = 2Na^+$$

wherein each Ar substituent is an independently chosen monovalent substituent selected from the group consisting of aryl, alkaryl, haloaryl, aroxyaryl and alkoxyaryl substituents, and L is a bivalent substituent selected from the group consisting of arylene, haloarylene, alkarylene, aroxyarylene, oxy-di(arylene) and alkoxyarylene substituents.

2. The composition having the formula:

$$[C_6H_5)_3B-C_6H_4-B(C_6H_5)_3]2Na$$

3. The composition having the formula:

$$[C_6H_5)_3B-C_6H_4-O-C_6H_4-B(C_6H_5)_3]2Na$$

4. The composition having the formula:

$$[(C_6H_5)_3B-C_6H_4-C_6H_4-B(C_6H_5)_3]2Na$$

5. The composition having the formula $$[(CH_3C_6H_4)_3BC_6H_4B(C_6H_4CH_3)_3]2Na$$

6. The composition having the formula:

$$\left[\begin{array}{cc}(C_6H_5)_2B-C_6H_4-B(C_6H_5)_2\\ | \quad \quad | \\ C_6H_4CH_3 \quad C_6H_4CH_3\end{array}\right]2Na$$

References Cited by the Examiner

UNITED STATES PATENTS 3,187,054  6/1955  Willcockson et al. ___ 260—606.5

TOBIAS E. LEVOW, *Primary Examiner.*

W. F. W. BELLAMY, *Assistant Examiner.*